United States Patent [19]

Hughes

[11] 4,039,962

[45] Aug. 2, 1977

[54] SYSTEM FOR AMPLIFYING LASER BEAMS

[76] Inventor: John Leonard Hughes, 34 Nungara Place, Aranda, Australian Capital Territory, Australia

[21] Appl. No.: 686,473

[22] Filed: May 14, 1976

Related U.S. Application Data

[63] Continuation-in-part of Ser. No. 493,570, Aug. 1, 1974.

[51] Int. Cl.² .............................................. H01S 3/00
[52] U.S. Cl. ............................... 330/4.3; 331/94.5 D; 331/94.5 P
[58] Field of Search .................... 330/4.3; 331/94.5 C, 331/94.5 D, 94.5 E, 94.5 F, 94.5 P

[56] References Cited

U.S. PATENT DOCUMENTS

| | | | |
|---|---|---|---|
| 3,424,991 | 1/1969 | Martin | 330/4.3 |
| 3,466,569 | 9/1969 | Chernoch | 331/94.5 |
| 3,500,231 | 3/1970 | Tomiyasu et al. | 331/94.5 |
| 3,513,402 | 5/1970 | Marrison | 330/4.3 |

Primary Examiner—Maynard R. Wilbur
Assistant Examiner—T. M. Blum

[57] ABSTRACT

A uni-directional laser amplifier system including a diverged beam having either a single unstructured pulse or a train of such pulses amplified to a very high power level over a long, folded amplification path. The beam emerges via a large, elliptical, cross-section aperture. The system includes two spaced rows of amplifying segments of elliptical and progressively increasing cross-sectional area with each segment having two polished non-parallel flat end surfaces with the front surface of each being anti-reflection coated and the rear surface having a laser mirror attached thereto or separated in conjunction with it by at least half the length of the laser pulse to be amplified. The segments are oriented an an angle of approximately 45° to the length of its row and at an angle of about 90° to the segments which follows in the amplifying sequence so that any pair of segments in the row with their front faces facing each other will reflect the diverged beam traversing the amplifier to a total angle of about 180° with the beam traversing each segment twice during this process. The system further includes optical excitation sources positioned along each row of segments matching their respective parameters in both size and power and separated from each other by a pair of segments which turn the beam to the 180° angle.

8 Claims, 1 Drawing Figure

SYSTEM FOR AMPLIFYING LASER BEAMS

CROSS-REFERENCE TO RELATED APPLICATION

This is a continuation-in-part application of U.S. patent application Ser. No. 493,570, filed Aug. 1, 1974 by John Leonard Hughes.

BACKGROUND OF THE INVENTION

This invention relates to a system for amplifying laser beams to very high power levels using a segmented amplifier in which each segment includes a suitably excited laser medium and a reflector which totally or partially reflects the amplified laser beam.

There are many problems associated with the reliable operation of powerful laser systems. These arise from such defects as poor excitation efficiency of the laser medium, quality of the various optical components inserted into the path of the laser beam, e.g., beam expanders, electro- and magneto-optic switches, quality of the laser beam and the control of the environmental parameters under which the laser system is operated.

The trend to high laser output power intensifies the present problems associated with larger diameter, higher quality and intense beams. The present invention provides for a relatively compact, ultra high power laser amplifier system which can produce very large diameter, high quality laser beams using very few optical components.

The power output of a laser amplifier system can be approximated by the relationship $$P = (e A/t) \text{ watts} \qquad (1)$$

where $e$ is the safe loading of the laser medium, or its container in joules cm.$^{-2}$, $A$ the effective area of the output aperture in cm.$^2$ and $t$ the duration of the laser output pulse. For continuous wave output $t$ will be taken to be 1 second.

Laser applications for example in the fields of controlled thermonuclear fusion and non-linear optics demand extremely high peak power output from laser systems. The situation has now been reached where the required increases in the peak power output $P$ relies to a greater extent on increasing the output area $A$ because it is becoming increasingly difficult to improve the radiation loading $e$ and to shorten the pulse duration $t$.

This invention provides a solution to the problem of generating very high laser output powers by allowing for large output areas $A$, but at the same time minimizing the most detrimental effects of large radiation loadings $e$ in conjunction with both large and small values of the pulse duration $t$ in a relatively compact amplifier arrangement.

A major difficulty with high power laser systems is to minimize the destructive effects, e.g., self-focussing or beam collapse of large $e/t$ ratios. For example, in present high power rod-disc neodymium doped glass laser systems $e$ values lie in the range 0.1 to 1 joules cm.$^{-2}$ for $t$ values ranging from $10^{-11}$ to $10^{-10}$ seconds, i.e., $e/t$ values of between $10^9$ and $10^{10}$ watts cm.$^{-2}$ as a relatively safe operating range.

If the possibility of improving the $e/t$ ratio is neglected then the way to higher powers must involve the use of multiple laser beams or a very large single beam. Current high power neodymium doped glass laser systems being developed for laser fusion studies use both these techniques in that they have as many as twelve laser beams, each one of large diameter up to 30 cm., producing between $10^{12}$ and $10^{13}$ watts peak power per system.

Unfortunately, the area of the output aperture cannot be increased arbitarily because large output aperture areas $A$ lead to factors which can drastically affect the quality of the laser beam, and hence the destructiveness associated with a given $e/t$ ratio.

The present invention allows for a very high quality laser beam by relying on the natural divergence of the beam to provide large diameter outputs and a large separation between segments of laser medium to monitor and maintain the required beam quality. The large segment separator is also used to increase the self-oscillation threshold along the beam amplification path. Uniform excitation of the laser medium is allowed for in the present invention. The quality of the laser media determines the ultimate effectiveness of the present invention and improvements in the laser media will have a corresponding improvement in their effectiveness.

Prior art high power systems utilize laser medium segments in a straight line extending over lengths of several tens of meters. The expansion of the beam is usually accommodated by the insertion of collimators, i.e., beam-expanding telescopes into the path of the laser beam. The self-oscillation of such a system is prevented by the insertion of electro- and magneto-optic switches. One disadvantage is that to achieve ultra high power beam outputs the length of the chain would have to be up to one kilometer or longer. Another disadvantage is that the inclusion of the collimators and switches causes a deterioration in beam quality, which in turn leads to damage in the laser media due to non-uniformity of the laser beam.

SUMMARY OF THE INVENTION

It is an object of the present invention to achieve a very long amplification path in a relatively compact laser amplifier configuration.

Another object is to achieve a very large diameter, high quality, ultra high power output beam using the natural divergence of the beam through the amplifier.

A further object is to ensure efficient amplification of a large diameter, high quality, ultra high power laser beam due to the double pass amplification through each segment of the laser medium.

A still further object is to achieve large separation between the two rows of segments forming the amplifier configurations leading to a relatively high threshold for self-oscillation along the amplification path.

These and other objects are attained by the system of this invention a summary of which follows, and which in turn is followed by details of a preferred system incorporating this present invention.

The invention provides a system for amplifying a high quality laser beam to very high power levels, thereby allowing up to twice the amplification efficiency of a single pass system, comprising means for directing a laser beam onto the input surface of a first laser medium segment of a plurality of laser media segments, the said laser media segments being located in a compact arrangement, each said laser medium segment being provided with means to reflect the laser beam onto the input surface of the next laser medium segment, the input surface of each said laser medium segment being provided with an anti-reflection coating to lessen spurious reflections, and each said laser medium segment having associated with it excitation means for exciting the laser media wherein the beam is successively and progressively increased in size and in power.

DETAILED DESCRIPTION OF THE INVENTION

Figure 1:
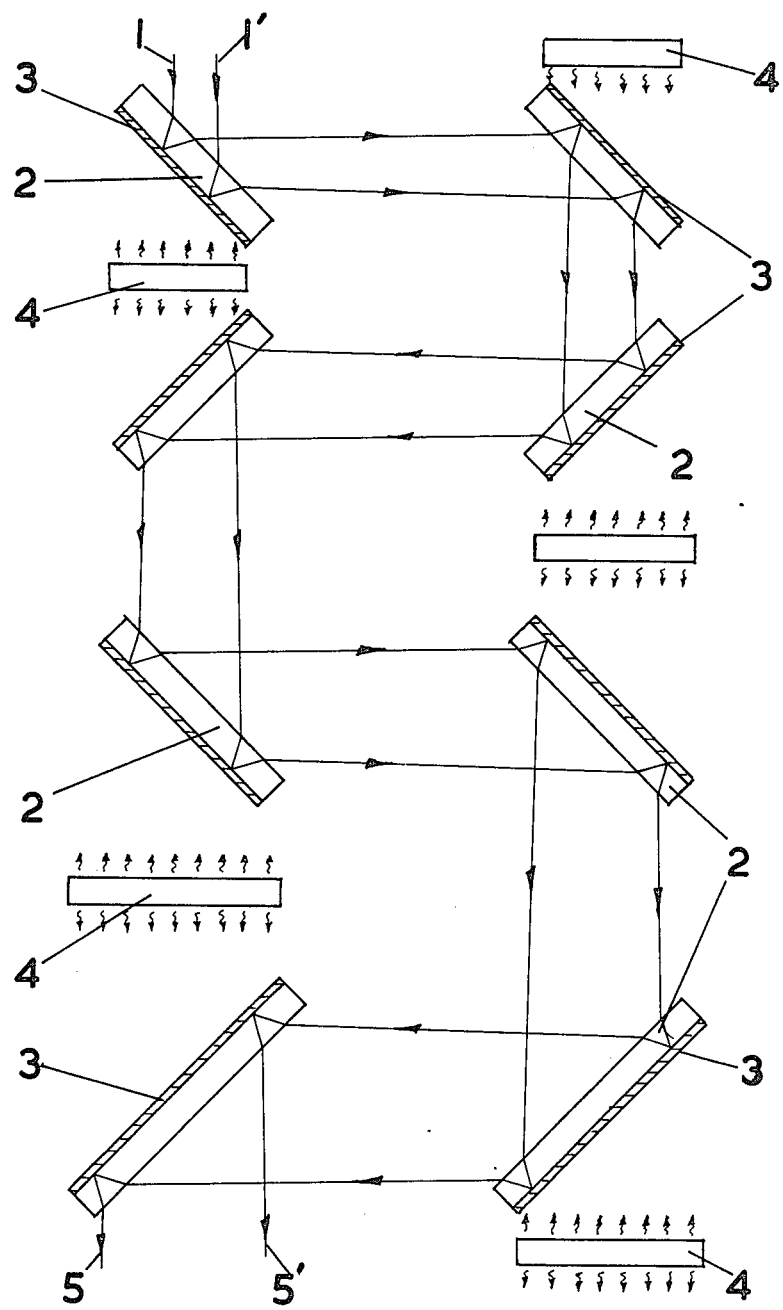

A better understanding of the invention will be gained from the following description taken in conjunction with the accompanying drawing. It is emphasised that the ensuing teachings are exemplary and not limitative of the scope and applicability of the invention.

In the drawing:

FIG. 1 is a schematic layout of a preferred system for amplification of laser radiation to very high power levels using a two unit segment.

Now having particular regard to the numerals on the drawing, 1 and 1' defines an input laser beam (generated in a manner known per se). Numeral 2 indicates the laser medium which may be a disc or else the slab configuration of the type described in my U.S. Pat. No. 3,928,811 granted Dec. 23, 1975 and assigned to Quentron Optics Pty. Limited, of Adelaide, Australia. Numeral 3 represents a dielectric or metallic mirror attached to or separated from the laser medium 2. (Note, on each of the input surface of the laser media there is an anti-reflection coating (not shown) to reduce spurious reflections from the laser beam). Numeral 4 represents the excitation radiation for the laser medium 2, e.g., arrays of flash tubes and/or photo-emitting diodes. 5 and 5' define the laser output beam 1, 1' is much smaller than 5, 5' in size and in power.

As viewed horizontally, i.e., from left to right, the distance between adjacent 2's can be very long, e.g., of the order of tens of meters, whilst viewed vertically, i.e., from an upper 2 to the adjacent lower 2 (these constitute a segment), the distances are several beam dimensions.

In a particular case the input beam 1, 1' may be of circular cross-section and between 5 and 10 cm. diameter, the distance between the horizontal 2's as set out above say 10 meters and the distance between the vertical 2's about 0.5 to about 3 meters. The output beam 5, 5' is then about 30 cm. to 1 meters in diameter.

As shown in FIG. 1 the laser beam is reflected through 180° using two reflectors orientated at approximately 45° in this instance. During this 180° reflection process the laser beam passes twice through each of two or more amplifying segments. The reflectors are such that they allow the excitation of the laser medium but reflect the laser wavelengths in the manner shown in the figure. However, if the excitation sources are arranged in other positions relative to the amplifying medium that it could be the case that the reflector may also be utilized to reflect part of the excitation radiation. If the excitation of the laser medium is other than optical then the reflector may or may not be involved in the excitation of the laser medium.

Naturally the relevant parts are optically polished.

The optimum arrangement in FIG. 1 is where the vertically adjacent "2" are so positioned that the input and output axes of the laser beam from the segment are parallel. However the invention is not so limited and the arrangement will still work if the positioning is not as above but then there is a consequent loss in compactness.

Cooling of the medium and the amplication of the laser beam may be improved by segmenting each of the main segments.

As previously mentioned a particular advantage of the laser amplifier based on the present invention is the fact that the segments of the amplifier, which will be of increasing sizes, can be well spaced out yet retain a reasonable compactness for the system as a whole. In this way the segmented amplifier will tend to possess a diminishing laser rod-like characteristic which is well known to be very detrimental to the amplifying process particularly with respect to subnano-second duration pulses whose self-focussing threshold is low both in rods and compact rod-like, disc amplifier. If self-focussing does take place in the present system, then only one segment would be involved since the self-focussed laser beam would diverge to lower intensities before striking the next segment which in a typical layout could be many tens of meters away.

The well spaced out segments also allow for the natural divergence of the laser beam over very long amplification paths. For example a 50 meter separation between the two rows of segments shown in FIG. 1, together with 10 traverses would give a total amplifier path length of over 500 meters in a relatively compact area. The invention therefore allows for the construction of relatively very long path length lasers using a minimum of only two rows of relatively compact segments.

Such a system is well suited for the amplification of very powerful laser pulses. If the reflector is attached to the laser medium then the laser pulse will overlap in the amplifying medium. If, however, the reflector is separated from the surface of the amplifying medium then no such pulse overlap need occur in the disc or slab amplifying medium and each disc or slab will be used twice in the amplifying process. If gaseous or liquid media are used for amplification of the laser pulse then they are contained in a disc or slab like container which may or may not take part in the actual amplifying process itself.

To reduce the scattering losses from the discs at the other then Brewster angle orientation they can be suitably coated. The other than normal orientation reduces the loading on all reflecting and anti-reflecting coatings.

It should be noted that the surfaces of the laser medium and mirror need not be parallel to each other.

It will be appreciated that my invention provides a unidirectional laser amplifier system utilizing a diverged, high quality beam composed of either a single, unstructured pulse, or a train of such pulses, amplified to a very high power level over a long, folded amplification path, emerging via a large, elliptical cross-section aperture.

An important feature of my invention as illustrated hereinbefore is the use of two, well spaced rows of amplifying segments of elliptical and progressively increasing cross-sectional area each segment possessing two optically polished, non-parallel, flat end surfaces with the front surface of each segment being anti-reflection coated and its rear surface having either a mirror deposited on it which reflects the laser beam 100%, or having the mirror attached to it and/or separated from the rear surface of the segment by at least half the length of the laser pulse to be amplified so that no pulse overlap occurs in the amplifying medium.

Each segment should be orientated at an angle of approximately 45° to the length of its row and at an angle of about 90° to the segment which follows in the amplifying sequence so that any pair of segments in the row with their front faces facing each other will reflect the diverged beam traversing the amplifier through a total angle of about 180° the beam traversing each segment twice during this process so that it emerges travelling approximately parallel to its path of incident but in the opposite direction and displaced by at least its own diameter in such a manner that it can traverse all remaining segments of the amplifier system.

Additionally optical excitation sources are positioned along each row of segments, matching their respective parameters in both size and power and separated from each other along a row of segments by a pair of segments which turn the beam through the 180° angle, excitation radiation from each output surface of the source except those facing input and output segments, traverse both segments in such a manner that one end of each segment is excited before the other due to the fact that excitation sources and the segments are orientated with respect to each other by an angle of approximately 45°.

A particular use for the present invention is in laser controlled thermonuclear reaction studies and in laser apparatus for non-linear optics studies.

Modifications may be made within the above described subject matter without departing from the spirit and scope of the invention.

I claim:

1. A uni-directional laser amplifier system utilizing a diverged, high quality beam composed of either a single, unstructured pulse, or a train of such pulses, amplified to a very high power level over a long, folded amplification path, emerging via a large, elliptical cross-section aperture, the system consisting of:
    a. two, well spaced rows of amplifying segments of elliptical and progressively increasing cross-sectional area each segment possessing two optically polished, flat end surfaces with the front surface of each segment being anti-reflection coated and its rear surface having either a mirror deposited on it which reflects the laser beam 100%, or having the mirror attached to it and/or separated from the rear surface of the segment by at least half the length of the laser pulse to be amplified so that no pulse overlap occurs in the amplifying medium;
    b. Each segment orientated at an angle of approximately 45° to the length of its row and at an angle of about 90° to the segment which follows in the same row so that any pair of segments in the row with their front faces facing each other will reflect the diverged beam traversing the amplifier through a total angle of about 180° the beam traversing each segment twice during this process so that it emerges travelling approximately parallel to its path of incident but in the opposite direction and displaced by at least its own diameter in such a manner that it can traverse all remaining segments of the amplifier system;
    c. Optical excitation sources positioned along each row of segments, matching their respective parameters in both size and power and separated from each other along a row of segments by a pair of segments which turn the beam through the 180° angle, excitation radiation from each output surface of the source except those facing input and output segments, traverse both segments in such a manner that one end of each segment is excited before the other due to the fact that the excitation sources and the segments are orientated with respect to each other by an angle of approximately 45°.

2. A laser amplifier system as claimed in claim 1 where the two rows of segments are separated by such a distance that the ratio of spontaneous to coherent radiation emitted by a particular segment is not sufficient, when combined with those of all the other segments to initiate the parasitic self-oscillation of the amplifier system as a whole.

3. A laser amplifier system as claimed in claim 1 where the minor axis of the output aperture is about 1 meter.

4. A laser amplifier system as claimed in claim 1 where the diameter of the output beam is up to 20 times larger than the diameter of the input beam thus giving an overall gain of 400.

5. A laser amplifier system as claimed in claim 1 where the excitation source is composed of flashtubes and/or photo-emitting diodes.

6. A laser amplifier system as claimed in claim 1 where the amplifying medium is neodymium doped glass.

7. A laser amplifier system as claimed in claim 1 where the laser medium is iodine contained in containers of elliptical cross-sections whose outside dimensions approximate those of the corresponding solid segments.

8. A laser amplifier segment as claimed in claim 1 where the two optically flat surfaces are oriented with respect to each other at an angle such that the residual reflection off the anti-reflection coated surface is directed out of the amplification path of the main beam thereby preventing main beam distortion by said reflection when it emerges from the amplifier system.

* * * * *